United States Patent
Ishikawa et al.

(10) Patent No.: US 6,523,882 B2
(45) Date of Patent: Feb. 25, 2003

(54) REAR GATE DOOR FOR VEHICLE

(75) Inventors: Kenichi Ishikawa, Chita-gun (JP); Fumio Noguchi, Chita-gun (JP)

(73) Assignee: Asahi Glass Company, Limited., Tokyo (JP)

( * ) Notice: Subject to any disclaimer, the term of this patent is extended or adjusted under 35 U.S.C. 154(b) by 0 days.

(21) Appl. No.: 09/927,639

(22) Filed: Aug. 13, 2001

(65) Prior Publication Data

US 2002/0024234 A1 Feb. 28, 2002

Related U.S. Application Data

(63) Continuation of application No. PCT/JP00/08820, filed on Dec. 13, 2000.

(30) Foreign Application Priority Data

Dec. 13, 1999 (JP) .............................. 11-353293

(51) Int. Cl.$^7$ ................................................. B60J 5/10
(52) U.S. Cl. ................................ 296/146.8; 296/146.5; 49/502
(58) Field of Search .......................... 296/146.5, 146.8, 296/106, 56; 49/502; 219/203

(56) References Cited

U.S. PATENT DOCUMENTS

| | | | | |
|---|---|---|---|---|
| 4,785,585 A | * | 11/1988 | Grier et al. | 49/349 |
| 4,882,842 A | * | 11/1989 | Basson et al. | 264/255 |
| 5,095,659 A | * | 3/1992 | Benoit et al. | 292/141 |
| 6,019,418 A | * | 2/2000 | Emerling et al. | 296/146.7 |
| 6,101,765 A | * | 8/2000 | Hashimoto et al. | 296/146.5 |
| 6,123,384 A | * | 9/2000 | Eustache et al. | 15/250.3 |
| 6,174,016 B1 | * | 1/2001 | Ponziani | 296/146.8 |
| 6,233,875 B1 | * | 5/2001 | Carlo et al. | 296/146.7 |

FOREIGN PATENT DOCUMENTS

| | | |
|---|---|---|
| JP | 7-37823 | 7/1995 |
| JP | 10-172657 | 6/1998 |

* cited by examiner

*Primary Examiner*—D. Glenn Dayoan
*Assistant Examiner*—Patricia L. Engle
(74) *Attorney, Agent, or Firm*—Oblon, Spivak, McClelland, Maier & Neustadt, P.C.

(57) ABSTRACT

An outer panel having a first panel portion is opposite to and joined to an inner panel having a second panel portion, whereby a door body having window openings is formed. An opening portion is formed in the first panel portion, positioned below the window opening, or the second panel portion, positioned below the window opening. A module panel, equipped with door-installed components including electrical equipment, is attached to the opening portion to construct the rear gate door for a vehicle. When the module panel is attached to the opening portion, the first connecting portion, attached to the module panel, is electrically connected to the second connecting portion, located the vicinity of the opening portion. Thus, the rear gate door for the vehicle enabling an assembling work and a door disassembling work easy is obtainable.

20 Claims, 4 Drawing Sheets

REAR GATE DOOR FOR VEHICLE

BACKGROUND OF THE INVENTION

1. Field of the Invention

The present invention relates to a rear gate door for vehicle, specifically, a rear gate door for vehicle, which can simplify an assembling work in a vehicle body assembly line.

2. Discussion of Background

In general, a door for a vehicle has a door body that is formed by joining an outer panel to an inner panel by welding. The inner panel is arranged on a cabin side and is provided opposite to the outer panel. A space is formed between the outer panel and the inner panel. The outer panel has a panel portion in a shape of a dish or a substantially flat plate. The panel portion becomes an outer plate of a vehicle body when the outer panel is attached to the vehicle body. The inner panel has a panel portion in a shape like a dish or a substantially flat plate, opposite to the panel portion of the outer panel when the inner panel is joined to the outer panel. Usually, the outer panel and the inner panel are stamped steel plates. In the space inside the door body, door-installed components such as electric equipment and so on are accommodated.

A rear gate door of a vehicle such as a hatch back or a wagon has a rotating shaft connected to a wiper motor, a license lamp, etc., which are exposed from an outer side surface of the vehicle in the panel portion of the outer panel. In the space inside the door body, a large amount of electrical equipment, such as a wiper motor, a high mount stop light, and a wire harness, is accommodated. The electrical equipment is assembled inside the door body through a maintenance hole that is formed in the panel portion of the inner panel by manual operation of a worker in an assembly line.

In some vehicles a conductor-printed glass or a glass having a heating wire is used as a window glass plate of a rear gate door for defogging and defrosting. In this case, a connecting portion such as a terminal and a connector for supplying an electric power to the conductor is located in the glass plate in the vicinity of an opening for the window in the door body. The connecting portion is attached to a tip of a conductive wire that is wired inside the door body of the rear gate door.

In general, the maintenance hole is very small. The process of assembling the large amount of electrical equipment and wiring the wire harness and the conductive wire at various positions on the rear gate door through such a small maintenance hole has been vexatious, complicated, and requires quite a long time. Recently, vehicle manufacturers have attempted to develop rear gate doors that can be easily disassembled in order to facilitate recycling of a door body and door-installed components.

SUMMARY OF THE INVENTION

The present invention provides a rear gate door for a vehicle, by which the process of assembling the door in an assembly line and installing the door into a vehicle body is simplified and the process of a work of disassembling the door is facilitated.

The present invention advantageously provides a rear gate door for a vehicle including at least an outer panel having a first panel portion that is a vehicle body outer plate when it is attached to the vehicle body. The rear gate door includes an inner panel having a second panel portion that is arranged opposite to the first panel portion so as to form a space therebetween when it is attached to a cabin side of the outer panel. The rear gate door further includes door-installed components including electrical equipment. Window openings are formed on upper sides of the first panel portion and the second panel portion, and an opening portion is formed below the window opening of the first panel portion or the window opening of the second panel portion. A module panel assembled with the door-installed components and a first connecting portion for supplying an electric power from an outside to the door-installed components is attached to the opening portion, and the first connecting portion is electrically connected to a second connecting portion, equipped in the first panel portion or the second panel portion.

The upper sides of the first panel portion and the second panel portion designate a side along a roof of the vehicle in the panel portions when the panel portions are attached to the vehicle. Although there is no specific limitation in modes of the opening portion and the module panel, it is preferable that the module panel is engaged with the opening portion. A terminal, a connector, and so on can be adopted as the first connecting portion and the second connecting portion.

In the above-mentioned rear gate door for the vehicle, the door-installed components are attached to the module panel in a state that the door-installed components, including the electrical equipment, are easily wired. The assembling of the door-installed components is completed by attaching the module panel to the opening portion formed in the first panel portion or the second panel portion. Further, the electrical equipment is concentrated on and attached to the module panel, and an electric power is supplied to the electrical equipment by an electric connection between the first connecting portion and the second connecting portion, a wire harness for the electrical equipment is easily wired. Accordingly, the process of assembling the rear gate door into the body in an assembly line is simplified. When the door is disassembled for recycling, the door-installed components are simultaneously taken out when the module panel is taken out of the first panel portion or the second panel portion. Accordingly, the process of disassembling the door is facilitated.

In the rear gate door of the present invention, it is preferable that a window glass plate that is equipped with a conductor is attached to the above-mentioned window opening, the connecting portion of the conductor for supplying an electric power to the conductor is assembled in the above-mentioned module panel, and the above conductor is electrically connected to the above conductor connecting portion.

In the rear gate door for the vehicle having such a structure, by attaching the module panel to the opening portion, an electric power can be supplied to the conductor in the glass plate that is equipped with the conductor for defogging and defrosting. Accordingly, the process of wiring the wire harness for supplying an electric power to the conductor in the glass plate is unnecessary, whereby the process of assembling the body in an assembly line is simplified.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention with reference to FIGS. 1 through 6 as follows, wherein the same numerical reference is used for the same or similar portion and repetitive descriptions of these portions are omitted.

Figure 1:
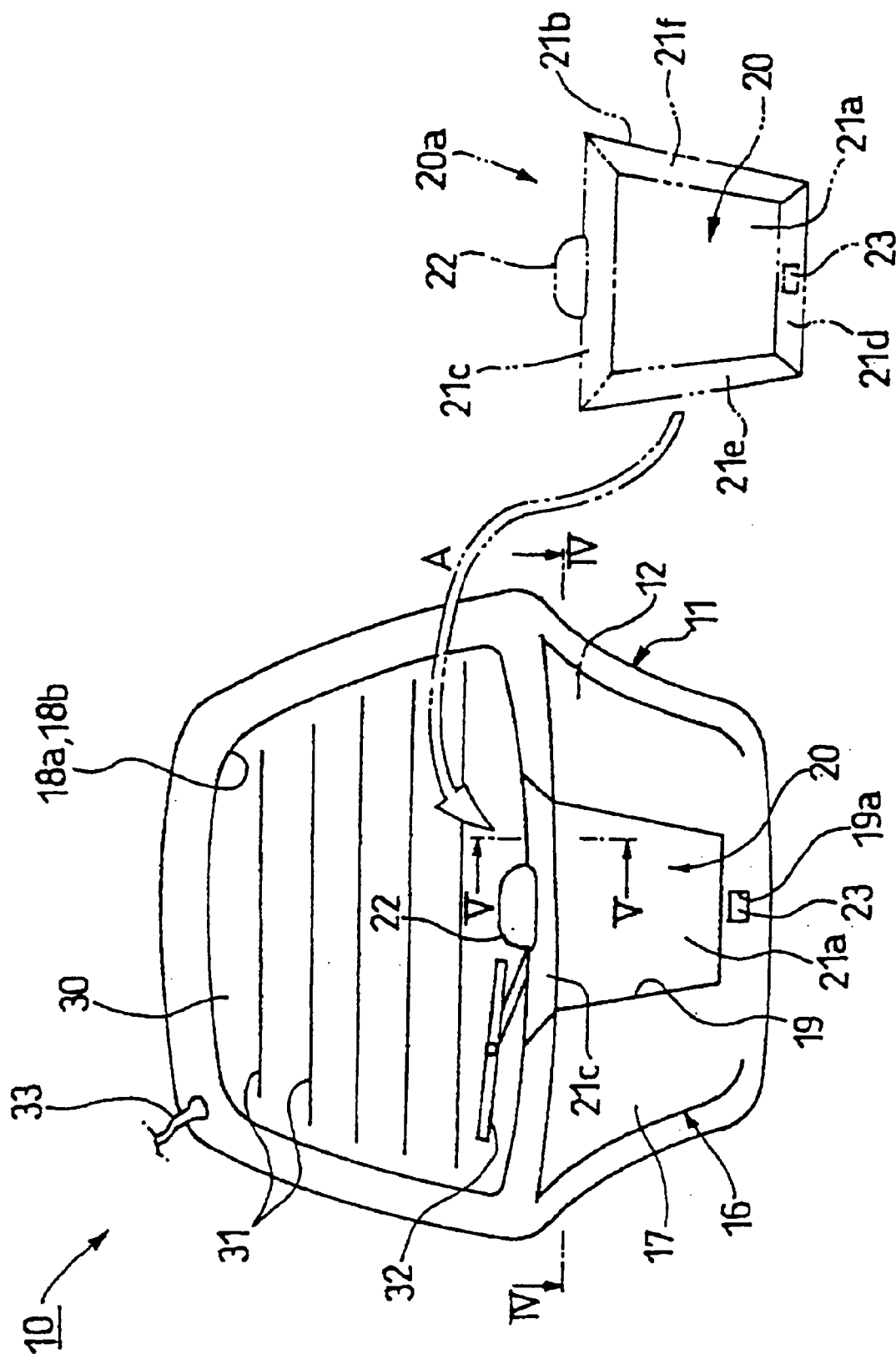
FIG. 1 is a schematic front view illustrating an example of a rear gate door for a vehicle according to the present invention.
Figure 2:
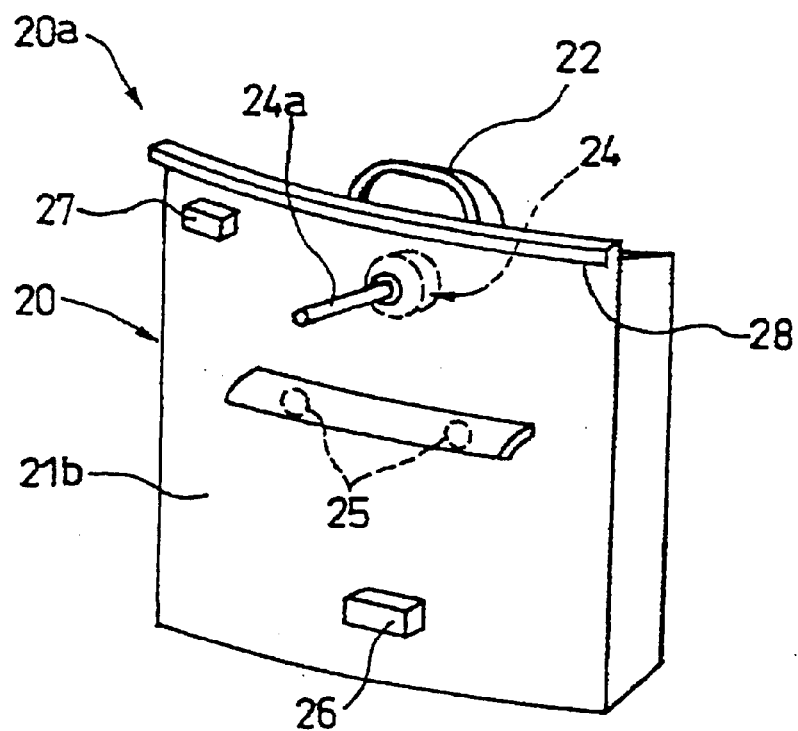
FIG. 2 is a schematic perspective view illustrating an example of a module panel according to the present invention.
Figure 3:
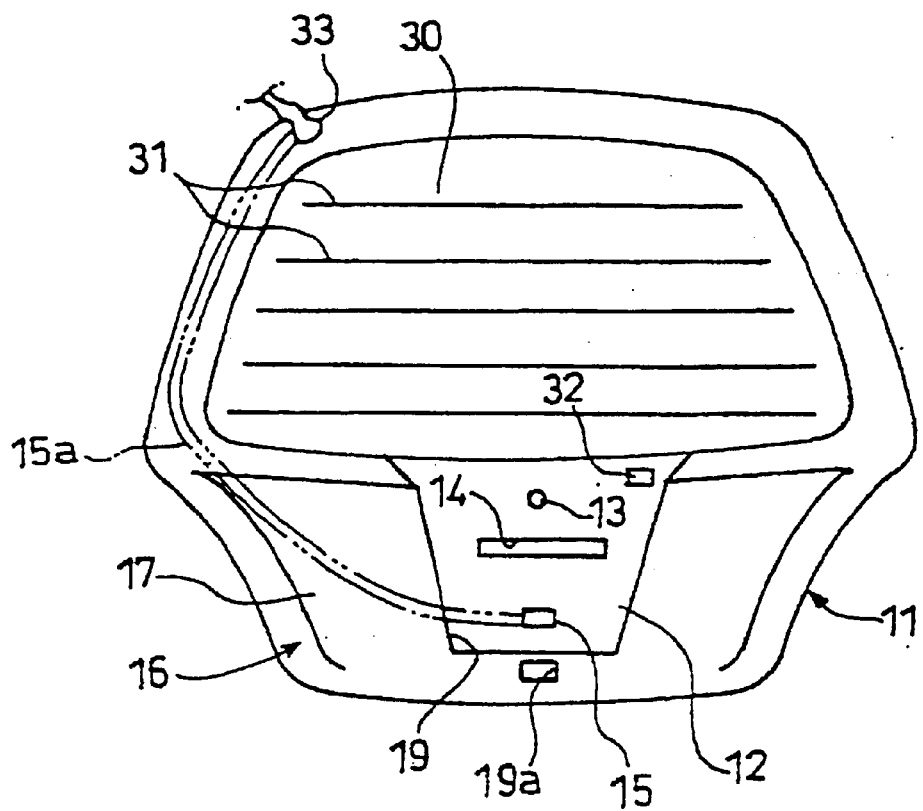
FIG. 3 is a schematic front view illustrating an example of a door body before attaching the module panel according to the present invention.
Figure 4:
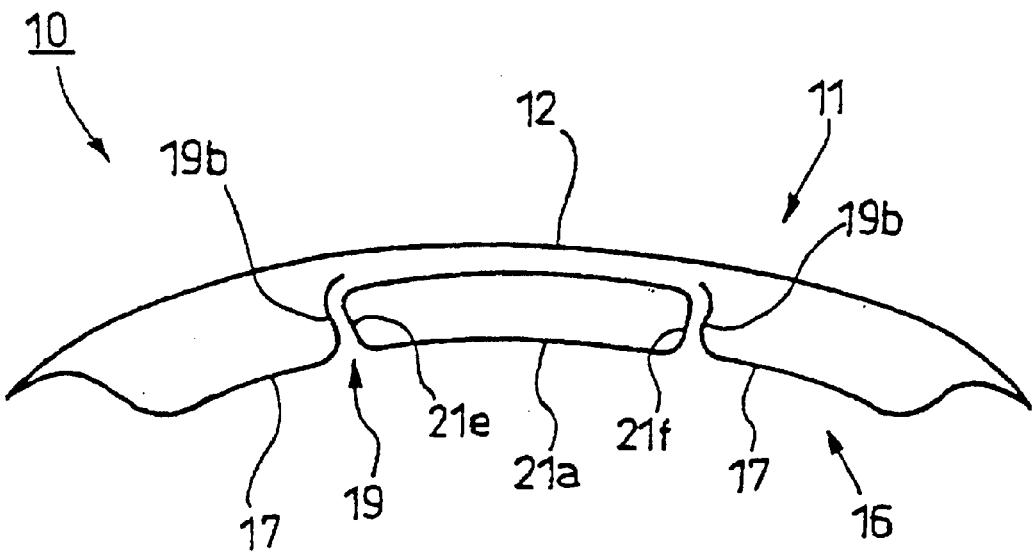
FIG. 4 is a cross-sectional view of the rear gate door taken along IV—IV in FIG. 1.
Figure 5:
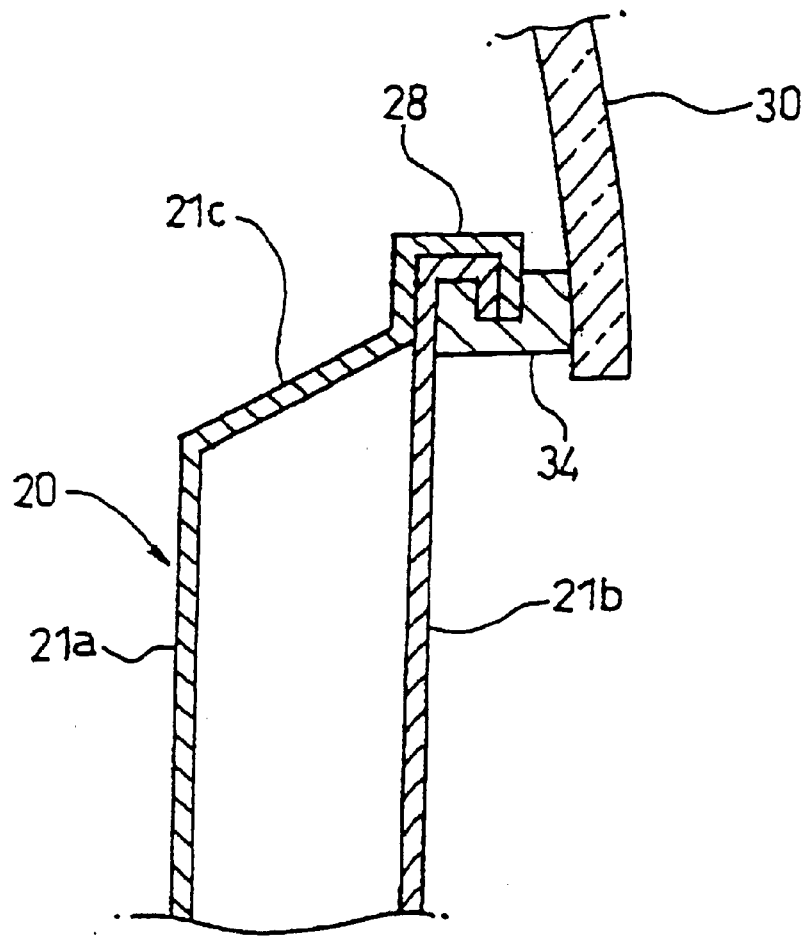
FIG. 5 is a cross-sectional view of the rear gate door taken along V—V in FIG. 1.

Hereinbelow, embodiments according to the present invention will be described in detail with reference to the figures. FIG. 1 is a schematic front view illustrating a rear gate door (hereinbelow, referred to as a tailgate) of a vehicle of a wagon type; FIG. 2 is a schematic perspective view illustrating a module panel; FIG. 3 is a schematic front view illustrating a door body of the tailgate before attaching the module panel; FIG. 4 is a cross-sectional view of the tailgate taken along IV—IV in FIG. 1; and FIG. 5 is a cross-sectional view of the tailgate taken along V—V in FIG. 1.

As illustrated in FIG. 1, the tailgate 10 has an outer panel 11, and an inner panel 16 attached to the outer panel 11 on a cabin side. There is no specific limit in materials of the outer panel 11 and the inner panel 16, and a metal such as steel, a resin, and so on are exemplified. The door body is formed by joining the inner panel 16 to the outer panel 11. The inner panel 16 is attached to the outer panel 11 so as to be opposite to form a space therebetween.

The outer panel 11 has a first panel portion 12 shaped like a three-dimensional curved plate, i.e. a dish, which becomes the body outer plate when it is attached to the body (not shown). The inner panel 16 has a second panel portion 17 shaped like a dish, which is attached to the cabin side opposite to the first panel portion 12 of the outer panel 11. On the upper side of the first panel portion 12, a window opening 18a is formed. On the upper side of the second panel portion 17, a window opening 18b is formed. A window glass plate 30 is mounted within the window openings 18a and 18b.

In this example, the window glass plate 30 is a glass plate having a heating wire. On the cabin side of the glass plate 30, a plurality of linear conductors 31 are vertically arranged with a gap so as to cross the glass plate 30 in a widthwise direction thereof. The linear conductors 31 are generally a fired product of a conductive ceramic paste including silver or the like. A wiper 32 is in contact with an outer side surface of the glass plate 30.

In the second panel portion 17 of the inner panel 16, an opening 19 is formed at a position lower than the window opening 18b. An upper part of the opening 19 is connected to the window opening 18. The second panel portion 17 does not intervene between the opening portion 19 and the window opening 18b. The opening portion 19 is shaped like a rectangle in a front view as in FIG. 1, and both sides of the opening portion 19 are angled so that a distance between the sides is narrowed toward a lower side.

A module panel 20, i.e. a rear gate door module 20a, which is previously assembled to have door-installed components such as a high mount stop lamp 22 and a latch 23 of a locking mechanism as a module, is attached to the opening portion 19. In this example, the module panel 20 is shaped like a box, and has a cabin side surface 21a, an outer side surface 21b, an upper surface 21c, a lower surface 21d, and side surfaces 21e and 21f. The cabin side surface 21a has a smaller area than the outer side surface 21b, wherein the upper surface 21c and the lower surface 21d are angled so as to be mutually apart toward the outer side, and the side surface 21e and the side surface 21d are angled so as to be mutually apart toward the vehicle outer side.

The cabin side surface 21a of the module panel 20 has a shape that is the same as the opening 19 of the inner panel 16, wherein the opening portion 19 is filled by attaching the module panel 20 to the opening portion 19. An opening 19a for a latch is formed in the second panel portion 17 to expose the latch 23 that is attached to the module panel 20.

As illustrated in FIG. 2, a rotating shaft 24a of a wiper motor 24, a license lamp 25, a first connecting portion 26 as a connector, and a conductor connecting portion 27 as a connector protrude from the vehicle outer side surface 21b of the module panel 20. The wiper motor 24, the license lamp 25, the conductor connecting portion 27, and the high mount stop lamp 22 are electrically connected to terminals (not shown), equipped inside the first connecting portion 26. Further, a window securing portion 28 is formed in the upper side of the vehicle outer side surface 21b.

As illustrated in FIG. 3, an opening for the rotating shaft 13 and an opening for the lamp 14 for exposing the rotating shaft 24a of the wiper motor 24 and the license lamp 25 (see FIG. 2) are formed at positions of the first panel portion 12 of the outer panel 11 corresponding to the opening portion 19. A second connecting portion 15 as a connector is attached to the cabin side surface of the first panel portion 12. The second connecting portion 15 is connected to an end of a bundle of wire harness 15a. The wire harness 15a is wired inside the door body. The other end of the wire harness 15a is connected to a vehicle body (not shown) from a vicinity of the upper side of the second panel portion 17 through a grommet 33. A connector 32, in which terminals electrically connected to the linear conductors 31 arranged in the glass plate 30 are built, is attached to the cabin side surface of the first panel portion 12.

Hereinbelow, a method of attaching the module panel 20 will be described in reference of FIGS. 1 through 3. At first, as designated by an arrow A in FIG. 1, the lower surface 21d of the module panel 20 is downwardly inserted in the opening portion 19 along a surface direction of the second panel portion 17 from a side of the window opening 18b of the opening portion 19 of the second panel portion 17. At this time, appropriate gaps are maintained among the outer side surface 21b, the first panel portion 12, and the glass plate 30 so that the door-mounted components 24a, 25, 26 and 27, protruding from the outer side surface 21b of the module panel 20, do not interfere with the glass plate 30 and the first panel portion 12. At a point that the lower surface 21d of the module panel 20 is in contact with the lower side of the opening portion 19, the downward insertion of the module panel is stopped. In the next, the module panel 20 is pushed from the cabin side to the outer side (from a closer side to a farther side on a paper surface of FIG. 1). At this time, the rotating shaft 24a of the wiper motor 24 and the license lamp 25 are exposed from the outside through the opening for the rotating shaft 13 of the first panel portion 12 and the opening for the lamp 14. Further, the first connecting portion 26 is engaged with the second connecting portion 15, and the conductor connecting portion 27 is engaged with the connector 32. Further, the latch 23 attached to the module panel 20 is exposed from the opening for the latch 19a of the second panel portion 17.

According to the above described procedure, the module panel 20 is attached to the opening portion 19.

As illustrated in FIG. 4, when the module panel 20 is attached to the opening portion 19, the cabin side surface 21a of the module panel 20 is substantially aligned with the cabin side surface of the second panel 17 of the inner panel 16. Further, the side surfaces 21e and 21f of the module panel 20 are supported by sidewalls 19b of the opening portion, which are protruded in mutually diverting directions from both side edges of the opening portion 19 to the outer side.

As illustrated in FIG. 5, when the module panel 20 is attached to the opening portion 19, the windows securing portion 28 of the module panel 20 is engaged with a securing member 34, which is attached to a lower side of the window glass plate 30, whereby the lower side of the glass plates 30 is secured. There is no limit to the various embodiments of the securing member 34. For example, the securing member may be made of a metal and attached to the lower side of the glass plate 30 by soldering.

According to the above-described tailgate 10, the door-installed components such as the high mount stop lamp 22, the latch 23, the wiper motor 24, and the license lamp 26 are attached to the module panel 20 so as to be easily wired. Further, by attaching the module panel 20 to the opening portion 19, formed in the second panel portion 17, assembling of the door-installed components is completed. Further, since major electrical equipment in the rear gate door such as the high mount stop lamp 22, the wiper motor 24, and the license lamp 26 are concentrated on and attached to the module panel 20 to supply an electric power by the bundle of the wire harness 15a, a wiring work of the wire harness is facilitated.

The present invention simplifies the work necessary to assemble the tailgate in a body assembly line. Specifically, by pushing the module panel 20 in so as to make the rotating shaft 24a of the wiper motor 24 and the license lamp 25 expose from the outer side of the vehicle, the first connecting portion, the second connecting portion, the conductor connecting portion, and the connector 32 are engaged, whereby workability of the assembly process is improved. Additionally, when the door is disassembled in order to recycle the parts, the door-installed components are simultaneously removed by removing the module panel 20 from the second panel portion 17. Accordingly, the process of disassembling the door is facilitated.

In the above example, the window glass plate 30 having the linear conductors 31 is attached to the window openings 18a and 18b, and the conductor connecting portion 27 for supplying an electric power to the linear conductors 31 is assembled to the module panel 20. By attaching the module panel 20 to the opening portion 19, an electric power is supplied to the linear conductors 31 through the conductor connection portion 27.

Figure 6:
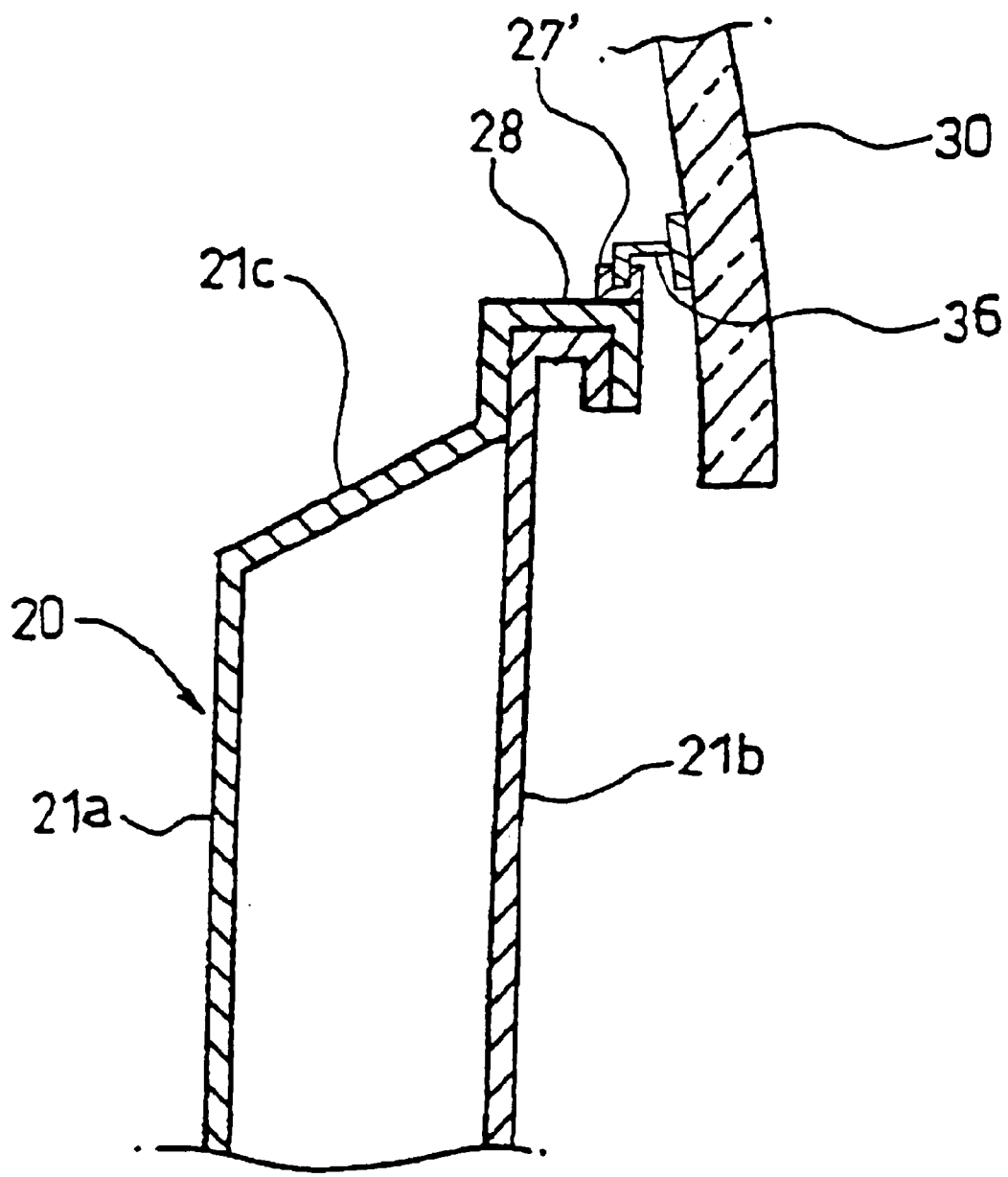
FIG. 6 is a cross-sectional view taken along V—V in FIG. 1 according to an alternative embodiment.

In this case, it is specifically preferable to adapt a connecting structure between a conductor connecting portion 27' and the linear conductors 31 as illustrated in FIG. 6. In other words, the linear conductors 31 are expanded to the lower side of the cabin side surface of the glass plate 30, and a window connector 36 is soldered to a bus bar of the linear conductors 31, and the window connector 36 is located on the lower side of the cabin side surface of the glass plate 30. The conductor connecting portion 27' protrudes from an upper end of the module panel 20. By attaching the module panel 20 to the opening portion 19 from an upper side of the opening portion 19, the window connector 36 is easily inserted in the conductor connecting portion 27'. Accordingly, a work of wiring the wire harness for supplying an electric power to the linear conductors 31 is minimized, and the conductor connecting portion 27' is electrically connected to the linear conductors 31 with ease, whereby the assembly process of installing the tailgate in the body in the assembly line is simplified.

In the above example, when the module panel 20 is attached to the opening portion 19, the cabin side surface 21a of the module panel 20 is substantially aligned with the cabin side surface of the second panel portion 17 of the inner panel 16. Therefore, an outer appearance is not spoiled.

When the module panel 20 is attached to the opening portion 19, the side surfaces 21e and 21f of the module panel 20 are supported by the sidewalls 19b of the opening portion, which are protruded in mutually diverting directions from both side edges of the opening portion 19 toward the outer side. Accordingly, it is possible to minimize onerous work, such as bolt tightening, at a time of attaching the module panel 20.

In the above example, when the module panel 20 is attached to the opening portion 19, the window securing portion 28 of the module panel 20 is engaged with the securing portion 34, attached to the lower side of the window glass plate 30, whereby the lower side of the glass plate 30 is secured. Accordingly, the window glass plate 30 is certainly secured.

The present invention is not limited to the above-described practical embodiments, and appropriate modification and improvement are possible. For example, in the above-described practical embodiments, the opening portion 19 is formed in the second panel portion 17 of the inner panel 16, an opening portion may be formed in the first panel portion 12 of the outer panel 11, and the module panel may be engaged with the opening portion from an outside of the vehicle. By this, a wiper can be previously attached to the module panel. On the other hand, it is preferable to form the opening portion in the second panel portion 17 as follows. In such an embodiment, a flange is formed in the first panel portion 12 or the second panel portion 17 to form the opening portion. When the flange is formed in the first panel portion 12 or the second panel portion 17, a contact trace is formed on a surface opposite to a surface having the flange. Because the contact trace is on the cabin side, it is preferable to form the opening portion in the second panel portion 17.

In the above-described practical embodiments, although the second connecting portion 15 and the connector 32 are attached to the first panel portion 12, these may be attached to, for example, the side wall 19b of the opening portion or the like. In this configuration, the connector 32 is engaged with the second connecting portion 15 when the module panel 20 is downwardly inserted from the side of the window openings 18a and 18b.

A window member such as a synthetic resin plate having transillumination may be used other than the glass plate. The window member may be movable with respect to the door body. Further, nothing may be mounted in the window opening. The window opening may be formed only in the outer panel. In this case, an upper end of the inner panel is lower than a position corresponding to the window opening, and joined to a part on a lower side than the window opening of the outer panel.

As described, according to the present invention, the assembling of the door-installed components is completed by attaching the module panel to the opening portion, formed in the first panel portion or the second panel portion. Further, since an electric power is supplied to the electrical equipment, which is concentrated on and attached to the module panel, by the electrical connection between the first connecting portion and the second connecting portion, the wire harness for the electrical equipment can be easily wired. Accordingly, the work in the assembly line of installing in the body is simplified. When the door is disassembled for recycling, the door-installed components are simultaneously removed by removing the module panel from the first panel portion or the second panel portion. Accordingly, a work of disassembling the door is facilitated.

In the rear gate door for the vehicle according to the present invention, the window glass plate having the conductors is attached to the window opening, the conductor connecting portions for supplying an electric power to the conductors is assembled in the module panel, and the conductors are electrically connected to the conductor connection portions, whereby the electric power is supplied to the conductors in the glass plate for defogging and defrosting by attaching the module panel to the opening portion. Accordingly, the work of wiring the wire harness for supplying the electric power to the conductors in the glass plate is minimized and the assembling work in the line of installing in the body is simplified.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 11-353293 filed on Dec. 13, 2001 including specification, claims, drawings and summary are incorporated herein by reference in its entirety.

What is claimed is:

1. A rear gate door for a vehicle comprising:
   an outer panel having a first panel portion being a vehicle body outer plate when the outer panel is attached to the vehicle;
   an inner panel having a second panel portion attached to a cabin side of the outer panel, the second panel portion forms a space between the first panel portion and the second panel portion when the second panel portion is attached to a cabin side of the outer panel, upper sides of the first panel portion and the second panel portion having window openings, an opening portion being formed below the window opening of the first panel portion or the second panel portion; and
   a module panel having door-installed components including electrical equipment and a permanently attached latch, the module panel having a first connecting portion for supplying an electric power from an outside to the door-installed components is attached to the opening portion, and the first connection portion is electrically connected to a second connecting portion located in the first panel portion or the second panel portion.

2. The rear gate door according to claim 1, wherein a window glass plate, provided with conductors, is attached to the window opening, a conductor connecting portion for supplying an electric power to the conductors is assembled in the module panel, and the conductors are electrically connected to the conductor connecting portion.

3. The rear gate door according to claim 2, wherein the conductors extend to a lower side of a cabin side surface of the window glass plate, window connectors are connected to and integrated with the conductors on the lower side, the conductor connecting portion protrudes from an upper end of the module panel, and the conductors are electrically connected to the conductor connecting portion when the module panel is attached to the opening portion.

4. The rear gate door according to claim 1, wherein the second connecting portion is located in the first panel portion or the second panel portion at a position where the first connecting portion is opposite thereto when the module panel is attached.

5. The rear gate door according to claim 1, wherein the opening portion is formed in the second panel portion.

6. The rear gate door according to claim 2, wherein the second connecting portion is located in the first panel portion or the second panel portion at a position where the first connecting portion is opposite thereto when the module panel is attached.

7. The rear gate door according to claim 2, wherein the opening portion is formed in the second panel portion.

8. The rear gate door according to claim 3, wherein the second connecting portion is located in the first panel portion or the second panel portion at a position where the first connecting portion is opposite thereto when the module panel is attached.

9. The rear gate door according to claim 3, wherein the opening portion is formed in the second panel portion.

10. The rear gate door according to claim 4, wherein the opening portion is formed in the second panel portion.

11. A rear gate door for a vehicle comprising:
    an outer panel having a first panel portion, being a vehicle body outer plate when it is attached to the vehicle body;
    an inner panel having a second panel portion which forms a space between the first panel portion and the second panel portion when it is attached to a cabin side of the outer panel, an upper side of the first panel portion having a window opening, an opening portion is formed below the window opening of the first panel portion; and
    a module panel having door-installed components including electrical equipment and a permanently attached latch, the module panel having a first connecting portion for supplying an electric power from an outside to the door-installed components is attached to the opening portion, and the first connection portion is electrically connected to a second connecting portion located in the first panel portion or the second panel portion.

12. The rear gate door according to claim 11, wherein a window glass plate, provided with conductors, is attached to the window opening, a conductor connecting portion for supplying an electric power to the conductors is assembled in the module panel, and the conductors are electrically connected to the conductor connecting portion.

13. The rear gate door according to claim 12, wherein the conductors extend to a lower side of a cabin side surface of the window glass plate, window connectors are connected to and integrated with the conductors on the lower side, the conductor connecting portion protrudes from an upper end of the module panel, and the conductors are electrically connected to the conductor connecting portion when the module panel is attached to the opening portion.

14. The rear gate door according to claim 11, wherein the second connecting portion is located in the first panel portion or the second panel portion at a position where the first connecting portion is opposite thereto when the module panel is attached.

15. The rear gate door according to claim 11, wherein the opening portion is formed in the second panel portion.

16. The rear gate door according to claim 12, wherein the second connecting portion is located in the first panel portion or the second panel portion at a position where the first connecting portion is opposite thereto when the module panel is attached.

17. The rear gate door according to claim 12, wherein the opening portion is formed in the second panel portion.

18. The rear gate door according to claim 13, wherein the second connecting portion is located in the first panel portion or the second panel portion at a position where the first connecting portion is opposite thereto when the module panel is attached.

19. The rear gate door according to claim 13, wherein the opening portion is formed in the second panel portion.

20. The rear gate door according to claim 14, wherein the opening portion is formed in the second panel portion.

* * * * *